(12) United States Patent
Fan et al.

(10) Patent No.: US 12,490,871 B2
(45) Date of Patent: Dec. 9, 2025

(54) TOWEL HEATING DEVICE

(71) Applicant: Guangzhou Hansong Tuojiang Technology Co., Ltd., Guangdong (CN)

(72) Inventors: Zhilin Fan, Guangdong (CN); Zhenji Lin, Guangdong (CN)

(73) Assignee: Guangzhou Hansong Tuojiang Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/216,795

(22) Filed: May 23, 2025

(65) Prior Publication Data

US 2025/0281005 A1   Sep. 11, 2025

Related U.S. Application Data

(63) Continuation-in-part of application No. 18/763,734, filed on Jul. 3, 2024, and a continuation-in-part of application No. 18/763,632, filed on Jul. 3, 2024, now Pat. No. 12,329,326.

(30) Foreign Application Priority Data

| Mar. 7, 2024 | (CN) | .......................... 202410260988.9 |
| Mar. 7, 2024 | (CN) | .......................... 202420441375.0 |
| Apr. 25, 2025 | (CN) | .......................... 202520812659.0 |

(51) Int. Cl.
| *A47K 10/02* | (2006.01) |
| *A47K 10/06* | (2006.01) |
| *F26B 9/00* | (2006.01) |
| *F26B 23/06* | (2006.01) |

(52) U.S. Cl.
CPC ............ *A47K 10/025* (2013.01); *F26B 9/003* (2013.01); *F26B 23/06* (2013.01); *A47K 10/06* (2013.01)

(58) Field of Classification Search
CPC ........ A47K 10/00; A47K 10/06; A47K 10/16; A47K 10/24; A45C 15/00; A45C 3/001; A45C 7/0095; H05B 3/34; F26B 9/003; F26B 23/06
USPC ....................................................... 219/392
See application file for complete search history.

(56) References Cited

U.S. PATENT DOCUMENTS

| 3,573,430 | A | * | 4/1971 | Eisler | ..................... H05B 3/565 |
| | | | | | 219/385 |
| 4,272,673 | A | * | 6/1981 | Semanaz | .................. H05B 3/16 |
| | | | | | 338/264 |
| 4,468,557 | A | * | 8/1984 | Bylin | ....................... H05B 3/36 |
| | | | | | 219/535 |
| 2004/0093758 | A1 | * | 5/2004 | Miller | ..................... D06F 58/14 |
| | | | | | 34/201 |

(Continued)

*Primary Examiner* — Sang Y Paik

(57) ABSTRACT

A towel heating device includes two body members, a foldable member, and a heating assembly. The two body members are arranged opposite to each other and capable of moving close to or away from each other. The foldable member is connected to the two body members. The foldable member and the two body members cooperatively define a heating cavity. The foldable member folds as the two body members move close to each other and unfolds as the two body members move away from each other. The heating assembly is distributed on the foldable member and at least one of the two body members and configured to heat the heating cavity.

19 Claims, 12 Drawing Sheets

(56) References Cited

U.S. PATENT DOCUMENTS

| | | | |
|---|---|---|---|
| 2005/0026495 A1* | 2/2005 | Zoller | B65H 75/4473 |
| | | | 439/501 |
| 2013/0153560 A1* | 6/2013 | Lev | H05B 3/34 |
| | | | 219/385 |

* cited by examiner

TOWEL HEATING DEVICE

CROSS REFERENCE TO RELATED APPLICATIONS

The present application is a continuation-in-part application of: the U.S. patent application Ser. No. 18/763,734, filed on Jul. 3, 2024; and the U.S. patent application Ser. No. 18/763,632, filed on Jul. 3, 2024. The present application claims the priority of: the Chinese patent application No. 202410260988.9, filed on Mar. 7, 2024; the Chinese patent application No. 202420441375.0, filed on Mar. 7, 2024; and the Chinese patent application No. 202520812659.0, filed on Apr. 25, 2025. Contents of which are incorporated herein by their entireties.

FIELD

The present disclosure relates to the field of bathroom appliances, and in particular to a towel heating device.

BACKGROUND

Towel heating barrels in a related art require heating elements to be mounted in a barrel body to heat a heating cavity in the barrel body. For foldable towel heating barrels, heating elements are typically only mounted on rigid shells on both sides of the foldable towel heating barrels, resulting in limited heating area and low heating efficiency for towels.

SUMMARY

A towel heating device is provided in the present disclosure. The towel heating device includes two body members, a foldable member, and a heating assembly. The two body members are arranged opposite to each other and capable of moving close to or away from each other. The foldable member is connected to the two body members. The foldable member and the two body members cooperatively define a heating cavity. The foldable member folds as the two body members move close to each other and unfolds as the two body members move away from each other. The heating assembly is distributed on the foldable member and at least one of the two body members and configured to heat the heating cavity.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
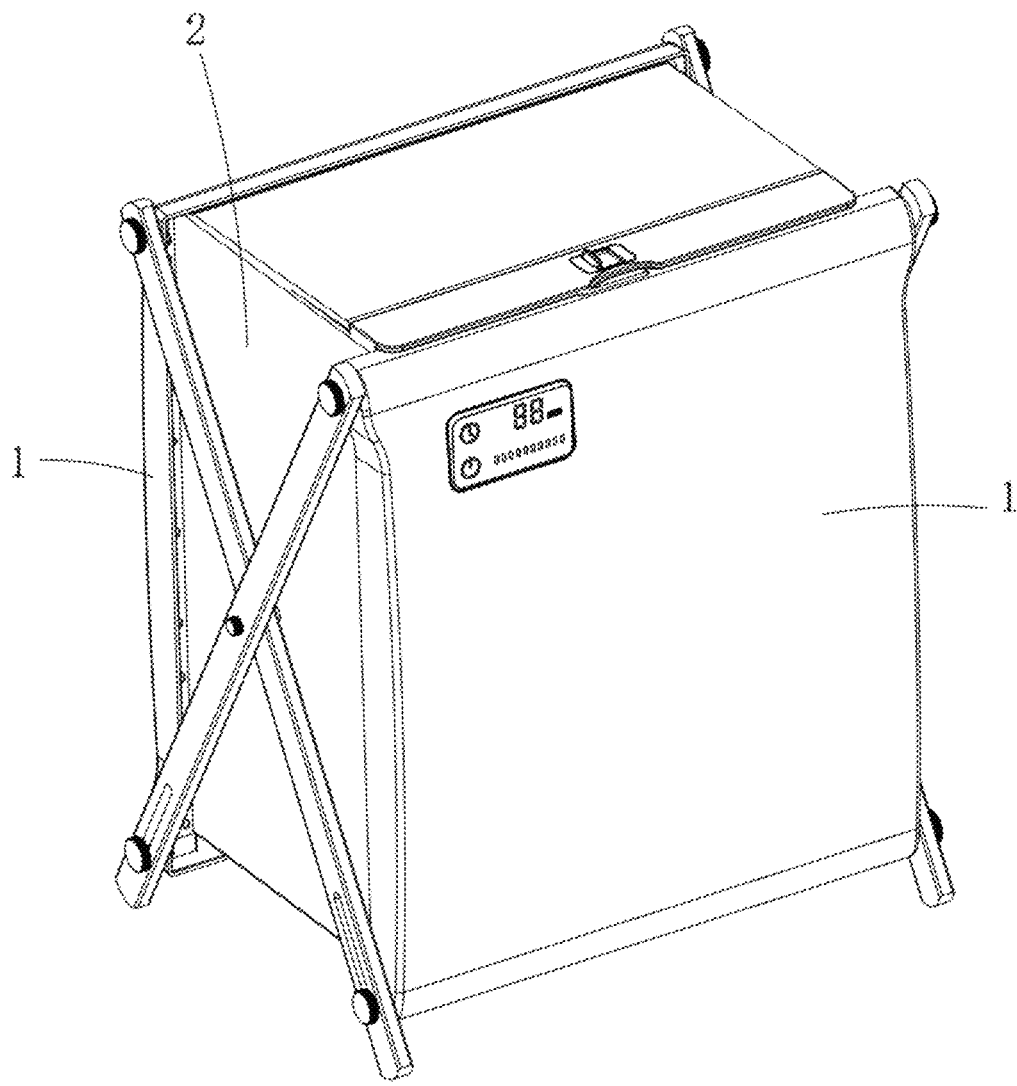
FIG. 1 is a schematic view of an overall structure of a towel heating device according to an embodiment of the present disclosure.
Figure 2:
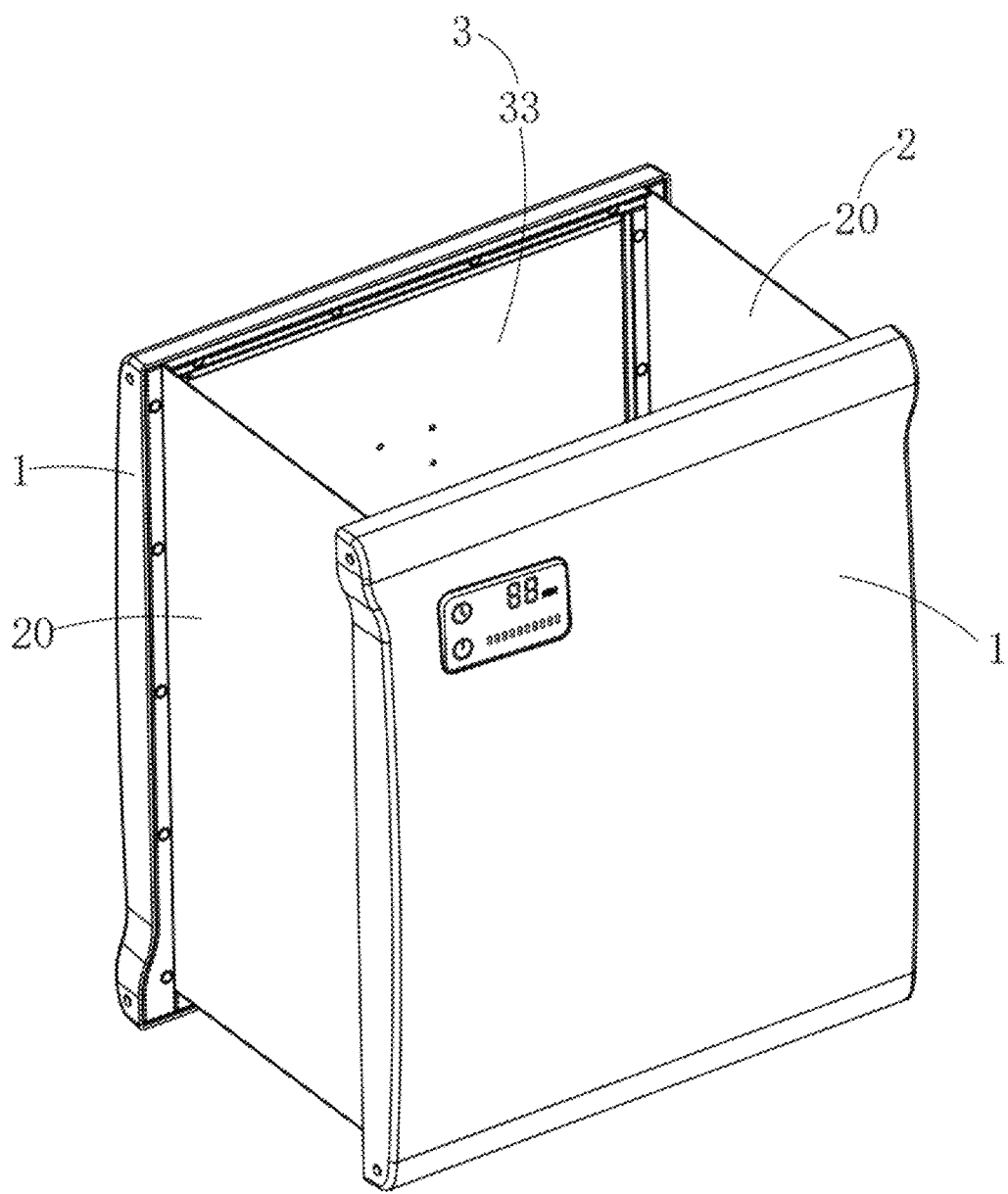
FIG. 2 is a structural view of a foldable member connecting two body members according to an embodiment of the present disclosure.

1—body member; 10—mounting cavity; 11—shell; 12—mounting frame; 111—bottom portion of the shell; 112—first wire hole; 113—second wire hole; 114—wire winding structure; 121—bottom portion of the mounting frame; 122—thermal insulation net;
2—foldable member; 20—partition; 21—flexible outer layer;
3—heating assembly; 31—control board; 32—flexible heating sheet; 33—heating plate; 321—first mounting sheet; 322—first heating wire; 331—second mounting sheet; 332—second heating wire; 333—metal plate; 3211—first heat conduction layer; 3212—thermal insulation layer; 3220—heating portion; 3221—connection end; 3311—second heat conduction layer; 3312—third heat conduction layer;
4—power cord;
100—heating cavity; 1001—side wall; 1002—bottom wall.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1 to 12, the present disclosure provides a towel heating device. The towel heating device includes two body members 1, a foldable member 2, and a heating assembly 3. The two body members 1 are arranged opposite to each other and are capable of moving close to or away from each other. Each of the two body members 1 may be a rigid structure, a flexible structure, or one of the two body members 1 may be a rigid structure, while the other of the two body members 1 may be a flexible structure, depending on usage requirements.

The foldable member 2 is connected to the two body members 1. The foldable member 2 and the two body members 1 cooperatively define a heating cavity 100. The foldable member 2 folds as the two body members 1 move close to each other and unfolds as the two body members 1 move away from each other. In one embodiment, the foldable member 2 is composed of a plurality of hard plates that can be folded relative to each other. The plurality of hard plates are connected to the two body members 1. In another embodiment, the foldable member 2 is entirely made of a flexible material. In yet another embodiment, the foldable member 2 is composed of a flexible outer layer 21 and a plurality of hard plates arranged in the flexible outer layer 21, the flexible outer layer 21 is connected to the two body members 1, and the foldable member 2 can be folded at a junction between each two adjacent hard plates.

The heating assembly 3 is distributed on the foldable member 2 and at least one of the two body members 1. The heating assembly 3 is configured to heat the heating cavity 100. To further improve heating efficiency of the heating cavity 100, the heating assembly 3 is distributed as widely as possible over an entirety of the foldable member 2 and the two body members 1, such that the heating assembly 3 can substantially surround the heating cavity 100, thereby improving the heating efficiency.

Additionally, as shown in FIG. 1, a support structure may be mounted on the body member 1 to lift the two body members 1 and the foldable member 2 off the ground.

In some embodiments, referring to FIGS. 5-7 and 10-12, the heating assembly 3 includes a control board 31, a flexible heating sheet 32, and at least one heating plate 33. Each of the flexible heating sheet 32 and the heating plate 33 is electrically connected to the control board 31. The control board 31 is mounted on the foldable member 2 or either of the two body members 1. The flexible heating sheet 32 is mounted on the foldable member 2 and is capable of folding or unfolding with the foldable member 2. The at least one heating plate 33 is mounted on at least one of the two body members 1. Particularly, each of the two body members 1 is arranged with one heating plate 33. The control board 31 is a PCB circuit board. Either of the two body members 1 can be arranged with a control panel which is electrically connected to the control board 31, allowing users to adjust a working state of the heating assembly 3 via the control panel.

Figure 5:
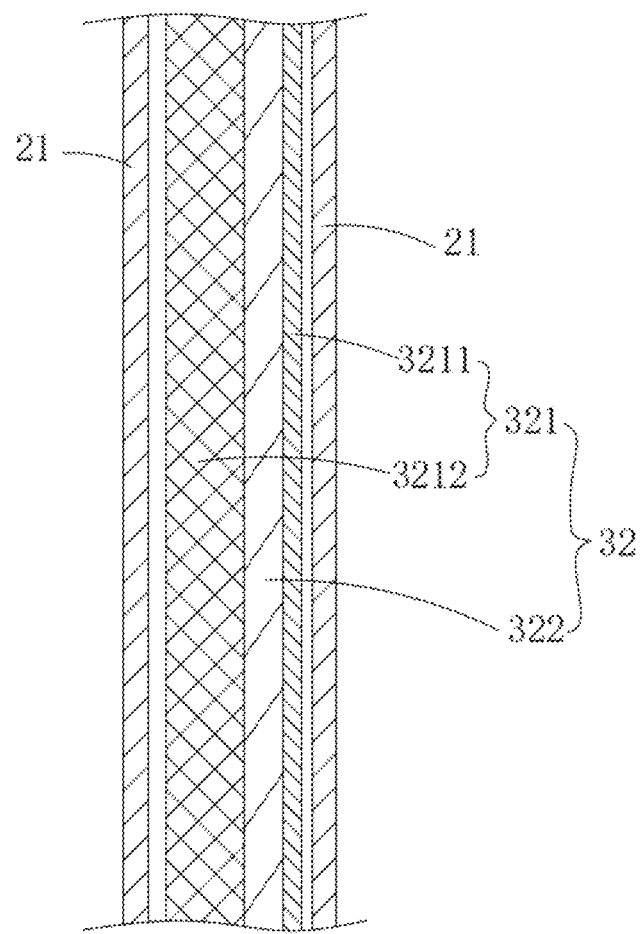
FIG. 5 is a cross-sectional view of a partial structure of the foldable member according to an embodiment of the present disclosure.

In some embodiments, referring to FIG. 5, the flexible heating sheet 32 includes a first mounting sheet 321 and a first heating wire 322 distributed on the first mounting sheet 321. The first mounting sheet 321 is fixedly mounted on the foldable member 2, such as by sewing or adhesive bonding.

The first heating wire 322 is composed of a high-resistivity wire and an insulating outer layer covering the high-resistivity wire. The first mounting sheet 321 is configured to fix a shape of the first heating wire 322, such as by sewing the first heating wire 322 to the first mounting sheet 321 to prevent displacement of the first heating wire 322.

Figure 6:
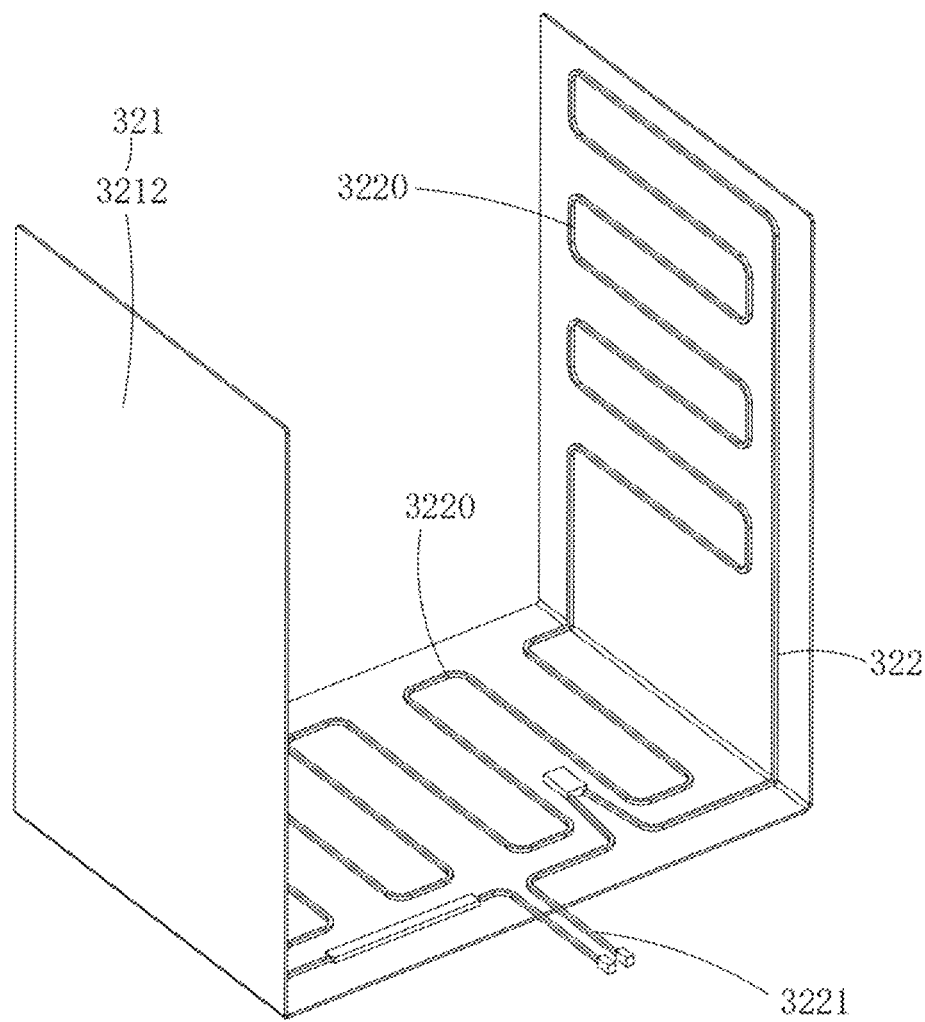
FIG. 6 is a first structural view of a flexible heating sheet according to an embodiment of the present disclosure.
Figure 7:
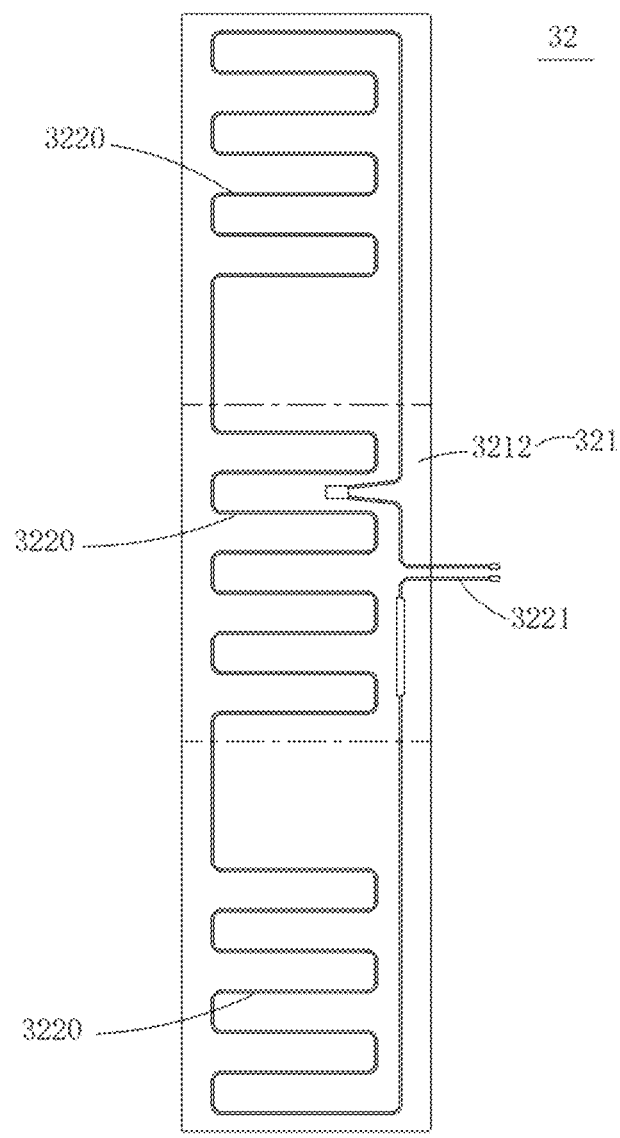
FIG. 7 is a second structural view of the flexible heating sheet according to an embodiment of the present disclosure.
Figure 8:
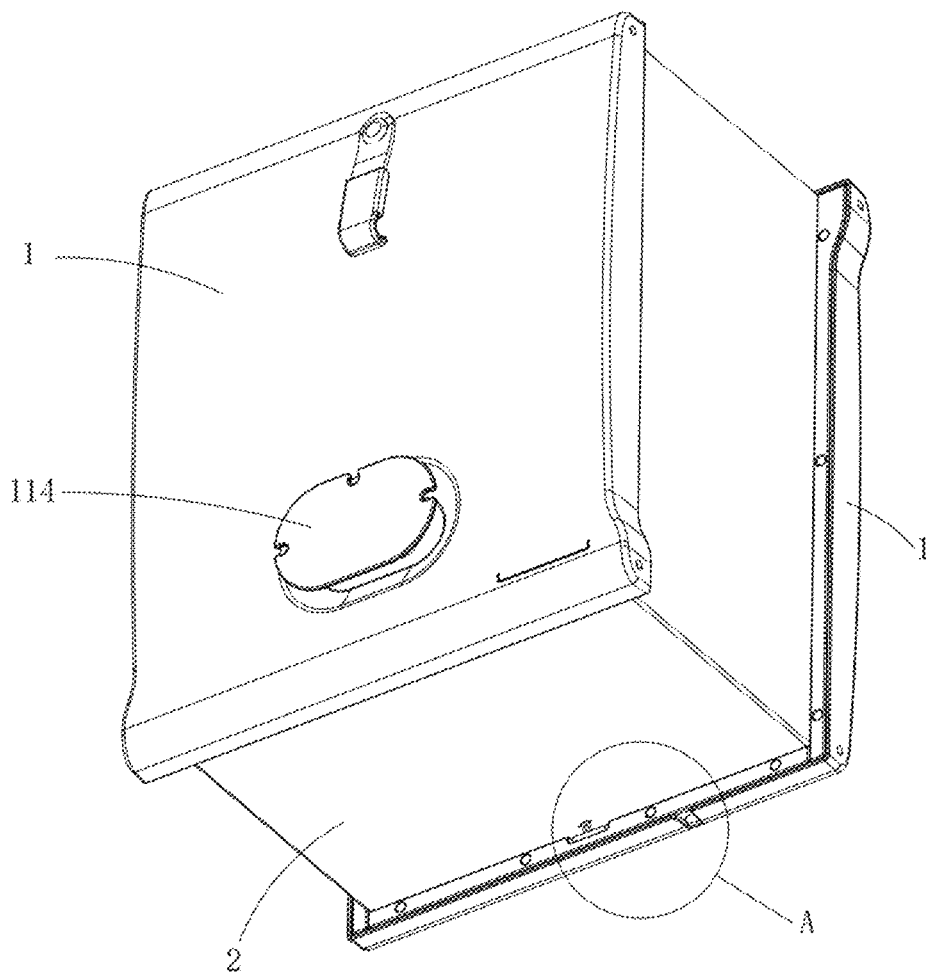
FIG. 8 is a structural view of the towel heating device according to an embodiment of the present disclosure, showing a bottom portion of the towel heating device.
Figure 9:
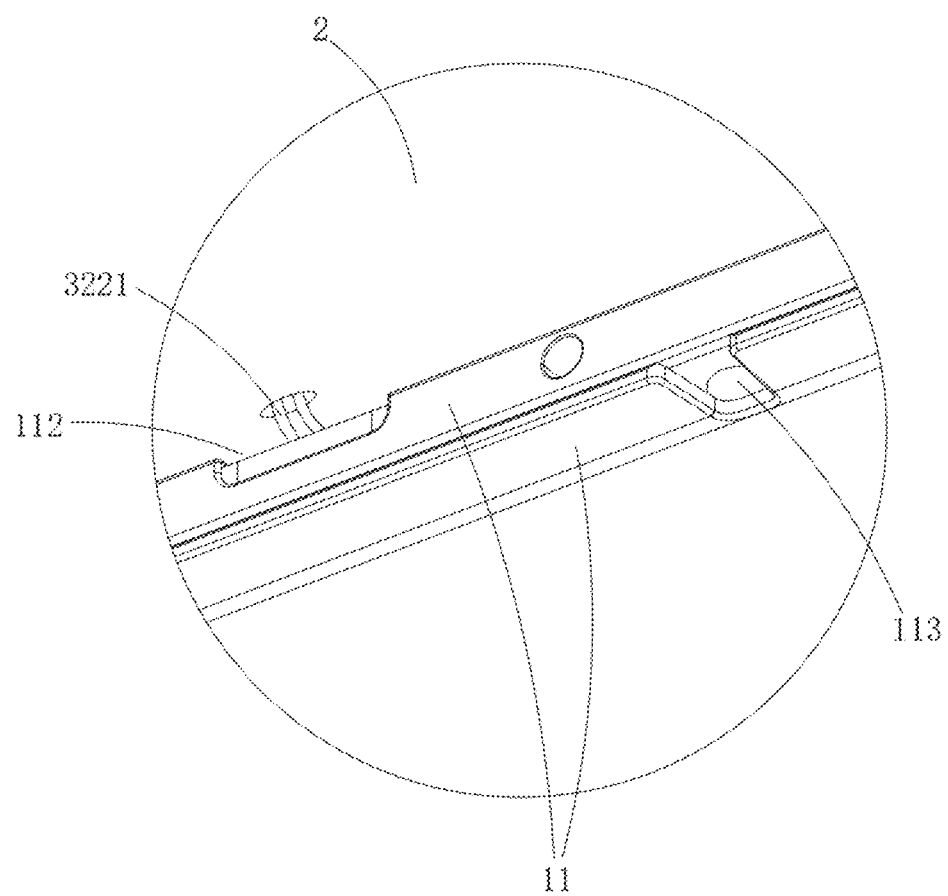
FIG. 9 is an enlarged view of a portion A in FIG. 8.

Referring to FIGS. 5 and 6, a distribution path of the first heating wire 322 is arranged as a continuous curve, primarily to increase a distribution area of the first heating wire 322 on the first mounting sheet 321, thereby expanding a heating area of the first heating wire 322.

Figure 3:
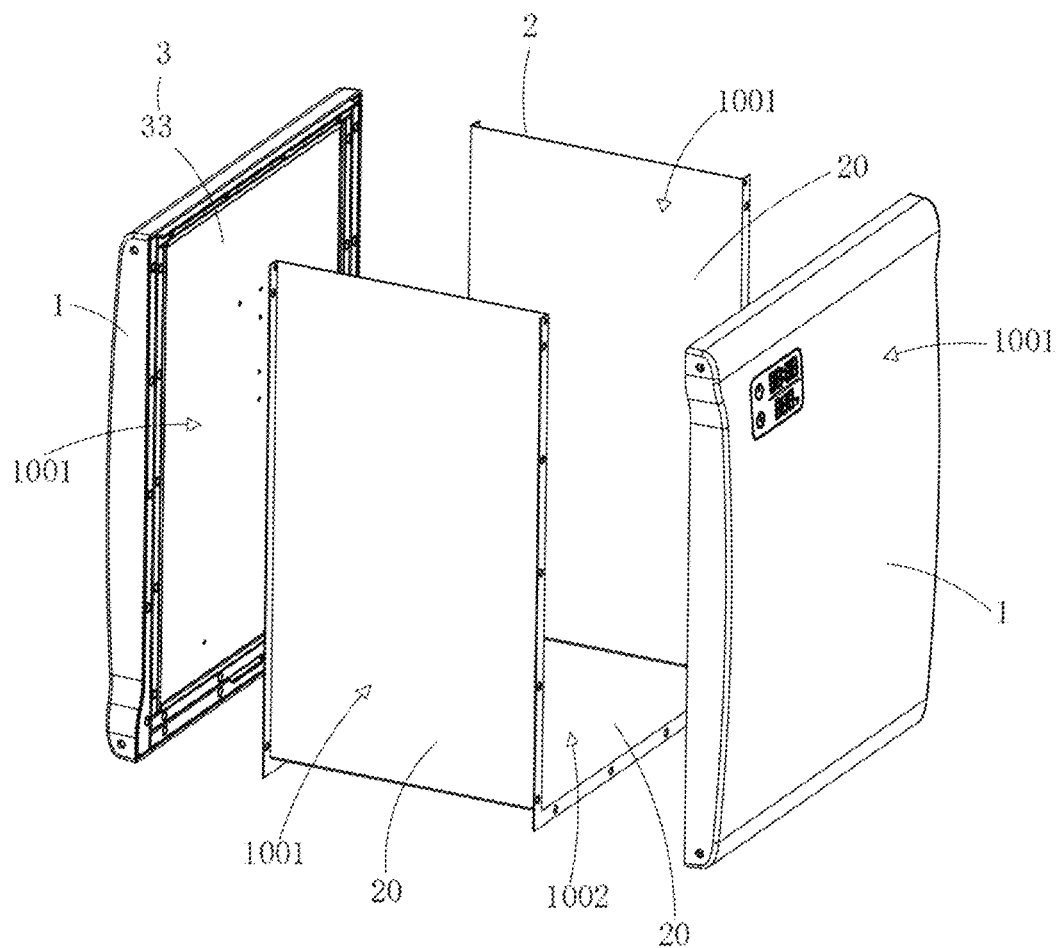
FIG. 3 is an exploded view of the foldable member and the two body members according to an embodiment of the present disclosure.
Figure 4:
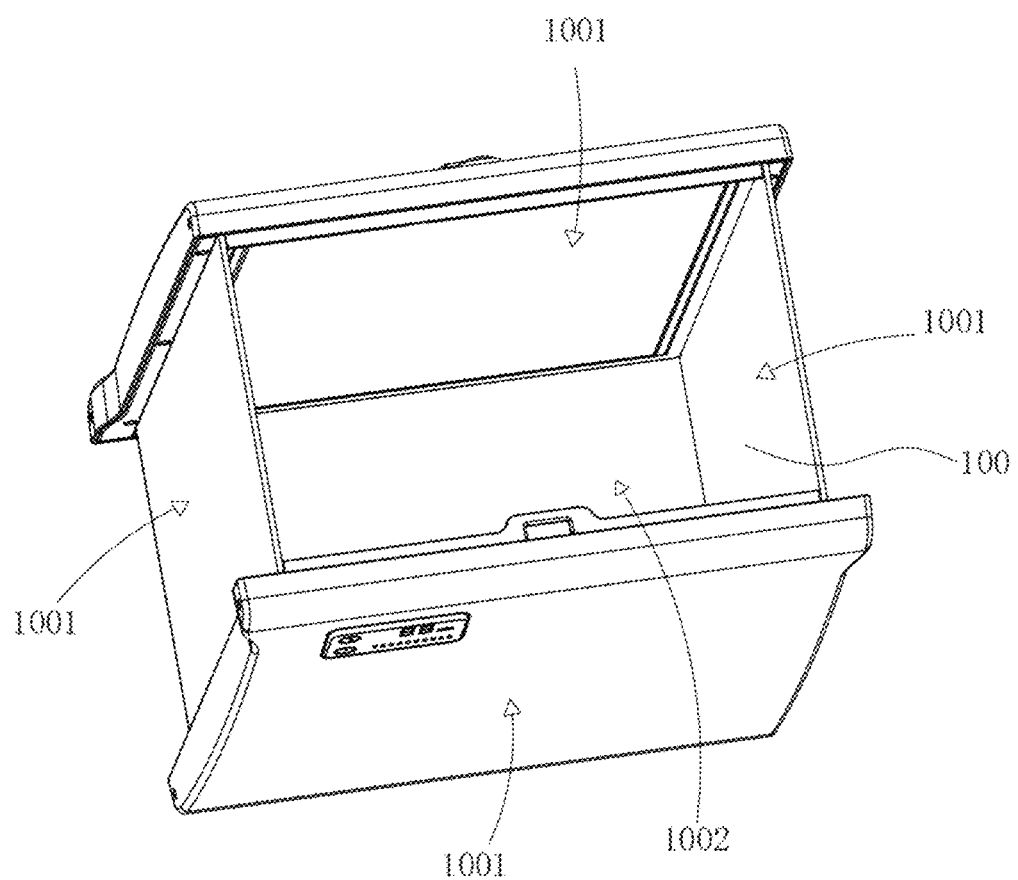
FIG. 4 is a structural view of four side walls and one bottom wall corresponding to a mounting cavity according to an embodiment of the present disclosure.

In some embodiments, as shown in FIGS. 3-4, the foldable member 2 includes at least three partitions 20 sequentially connected to each other. For ease of description, this embodiment describes the foldable member 2 as having three partitions 20, with any two adjacent partitions 20 capable of bending toward each other. One partition 20 forms a bottom wall 1002 corresponding to the heating cavity 100, and the other two partitions 20 face each other, and each of the other two partitions 20 forms a respective one of two side walls 1001 corresponding to the heating cavity 100. Each of the two body members 1 forms a respective one of the other two side walls 1001. The three partitions 20 and the two body members 1 cooperatively define the heating cavity 100 which is prism-shaped. The three partitions 20 and the two body members 1 further cooperatively form an opening at a top of the heating cavity 100 and communicated with the heating cavity 100. The opening is used for inserting towels. A cover may be added to the opening to open or close the heating cavity 100.

It should be noted that each partition 20 is at least partially flexible, allowing the each partition 20 to fold as the two body members 1 move close to each other and to unfold as the two body members 1 move away from each other.

The first heating wire 322 is locally densely arranged to form at least three heating portions 3220. Each of the at least three heating portions 3220 is distributed on a respective one of the at least three partitions 20. Each heating portion 3220 of the first heating wire 322 is arranged as a continuous curve, such as a continuous "U" shape. For example, in one embodiment shown in FIGS. 3, 6, and 7, the first heating wire 322 has three heating portions 3220, and each of the three heating portions 3220 is distributed on a respective one of the three partitions 20. In other words, the three heating portions 3220 are distributed on the bottom wall 1002 and the two side walls 1001 corresponding to the heating cavity 100. When one heating plate 33 is mounted on each of the two body members 1, each of the bottom wall 1002 and four side walls 1001 corresponding to the heating cavity 100 can emit heat toward the heating cavity 100. In another embodiment, the first heating wire 322 has six heating portions 3220, and each two heating portions 3220 are distributed on a respective one of the three partitions 20 (not shown in the drawings).

In some embodiments, referring to FIGS. 6-8 and 10, at least one body member 1 defines a mounting cavity 10. The control board 31 is mounted in the mounting cavity 10. The first heating wire 322 is arranged with a connection end 3221 at the bottom wall 1002, which extends out of the foldable member 2, enters the mounting cavity 10, and is electrically connected to the control board 31.

Specifically, the body member 1 includes a shell 11 and a mounting frame 12 mounted in the shell 11. The shell 11 is particularly rigid, and the mounting cavity 10 is defined in the shell 11. The mounting frame 12 is configured to mount the heating plate 33, and the heating plate 33 seals the mounting cavity 10. A first wire hole 112 is defined in a bottom portion 111 of the shell 11, and the connection end 3221 extends to the mounting cavity 10 through the first wire hole 112. Alternatively, the first wire hole 112 can be defined in a bottom portion 121 of the mounting frame 12. Furthermore, the towel heating device further includes a power cord 4. The control board 31 is mounted in the mounting cavity 10 of one of the two body members 1. A second wire hole 113 is defined in the bottom portion 111 of the shell 11 of the one of the two body members 1. The power cord 4 passes through the second wire hole 113 and is electrically connected to the control board 31 and is configured to connect the control board 31 to an external power source. Additionally, the control board 31 is mounted on one of the two body members 1, and the other of the two body members 1 is arranged with a wire winding structure 114 for winding the power cord 4 when the towel heating device is not in use.

In some embodiments, referring to FIG. 5, the foldable member 2 is sheet-shaped. The flexible heating sheet 32 is wrapped in the flexible outer layer 21 of the foldable member 2. The first mounting sheet 321 of the flexible heating sheet 32 includes a first heat conduction layer 3211 and a thermal insulation layer 3212. The first heating wire 322 is sandwiched between the thermal insulation layer 3212 and the first heat conduction layer 3211. The first heating wire 322 is sewn or adhesively fixed to the thermal insulation layer 3212, while the first heat conduction layer 3211 is adhesively or sewn to the thermal insulation layer 3212, and the first heat conduction layer 3211 covers the first heating wire 322. The first heat conduction layer 3211 faces the heating cavity 100, and the thermal insulation layer 3212 faces away from the heating cavity 100. Particularly, the first heat conduction layer 3211 is an aluminum foil. The heat generated by the first heating wire 322 is conducted to the aluminum foil, which dissipates heat over a larger area into the heating cavity 100, improving heating efficiency. The thermal insulation layer 3212 reduces a rate of heat dissipation from the first heating wire 322 to an outside of the towel heating device, helping to maintain a temperature in the heating cavity 100.

Figure 10:
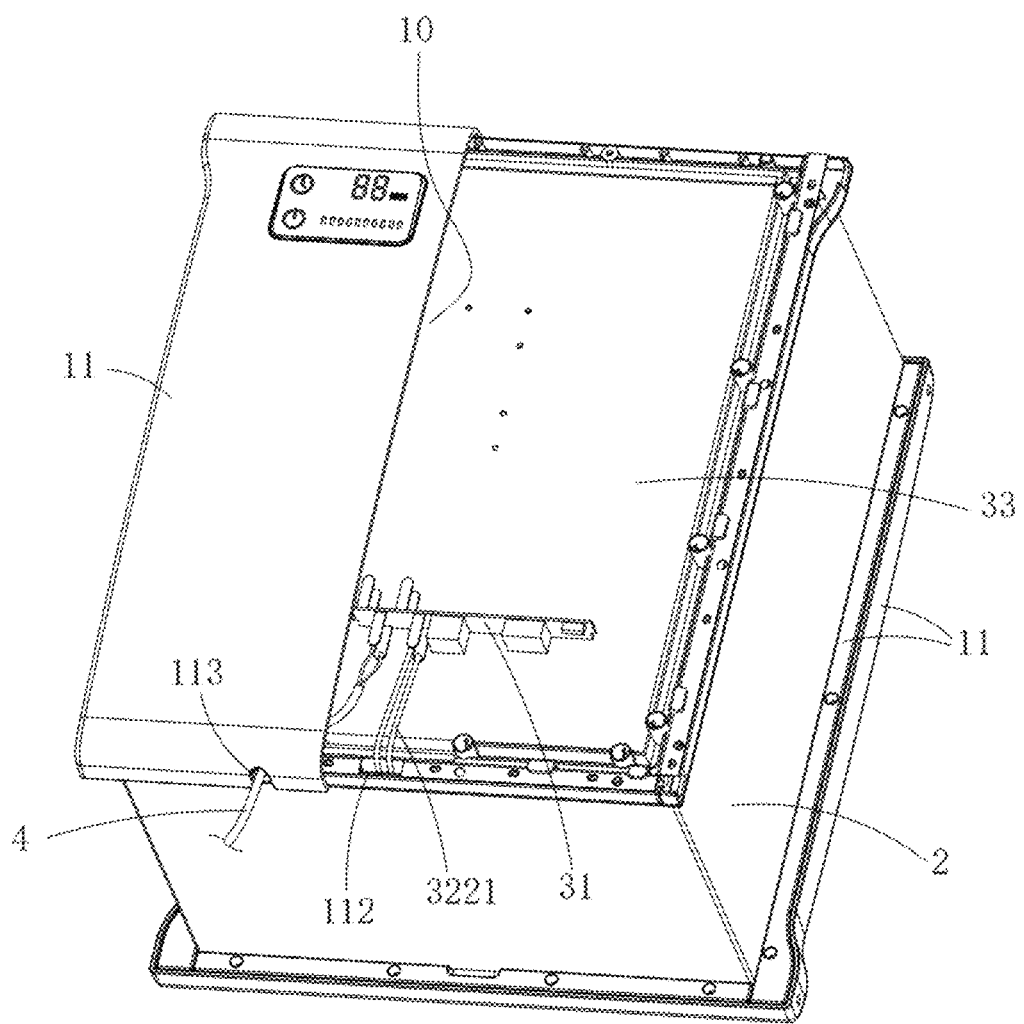
FIG. 10 is a cross-sectional view of a partial structure of the towel heating device according to an embodiment of the present disclosure.
Figure 11:
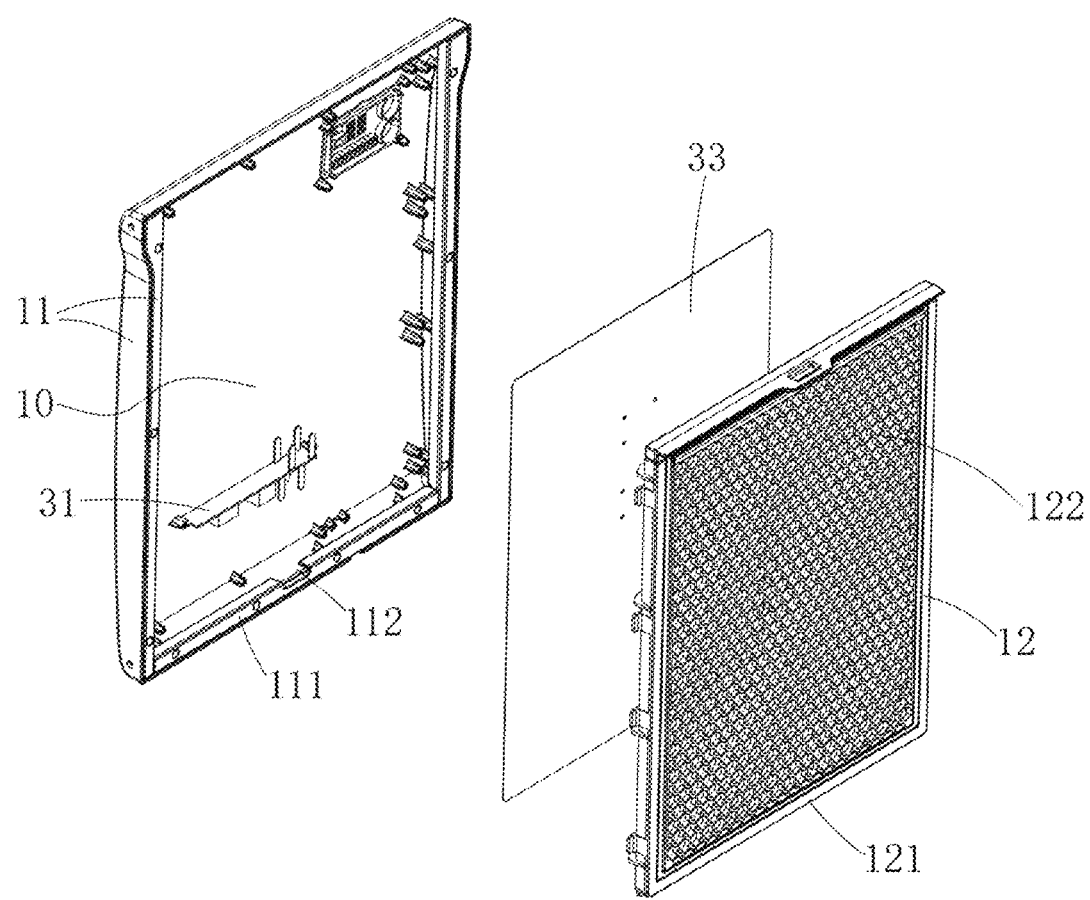
FIG. 11 is an exploded view of a body member according to an embodiment of the present disclosure.
Figure 12:
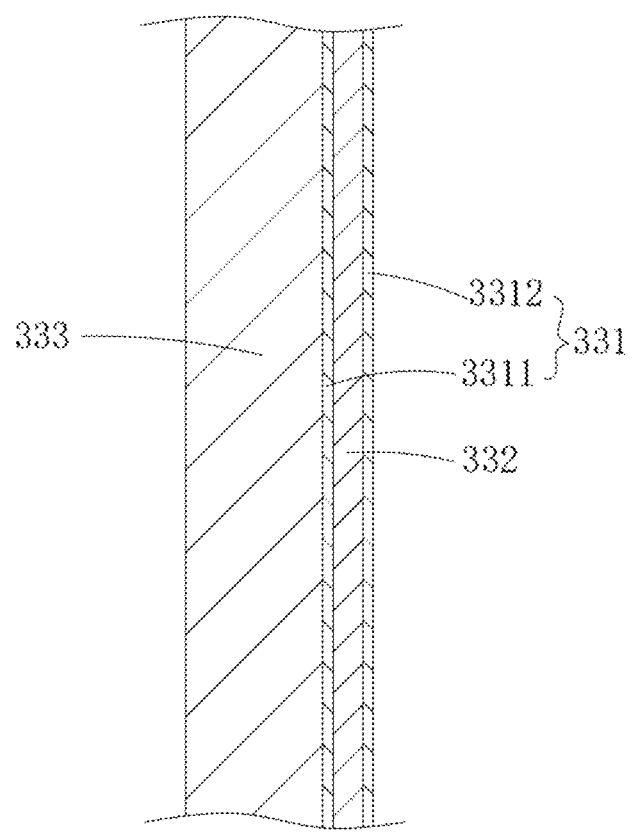
FIG. 12 is cross-sectional view of a partial structure of a heating plate according to an embodiment of the present disclosure.

In some embodiments, referring to FIGS. 10-12, the heating plate 33 includes a metal plate 333, a second mounting sheet 331, and a second heating wire 332. The metal plate 333 is mounted on the body member 1, the second mounting sheet 331 is fixed on the metal plate 333, and the second heating wire 332 is distributed on the second mounting sheet 331. Specifically, the second heating wire 332 is fixed on the second mounting sheet 331 to prevent displacement of the second heating wire 332, such as by sewing, adhesive bonding, or vacuum encapsulation. Alternatively, the second heating wire 332 is embedded in the second mounting sheet 331 and secured via the vacuum encapsulation. The second heating wire 332 is also composed of the high-resistivity wire and the insulating outer layer wrapping the high-resistivity wire.

Particularly, a distribution path of the second heating wire 332 is arranged as a continuous curve. A structure of the second heating wire 332 is not shown in the drawings but can be arranged similarly to the heating portions 3220 of the first heating wire 322, primarily to increase a distribution area of the second heating wire 332 on the second mounting sheet 331, thereby expanding a heating area of the second heating wire 332.

In some embodiments, referring to FIG. 11, the second mounting sheet 331 and the second heating wire 332 mounted on the second mounting sheet 331 are located on a side of the metal plate 333 facing away from the heating cavity 100. Heat generated by the second heating wire 332 is conducted through the second mounting sheet 331 to the metal plate 333, and then dissipated by the metal plate 333 into the heating cavity 100. This allows the second heating wire 332 to utilize the metal plate 333 with a larger surface area for heat dissipation, increasing the heating area while reducing a localized temperature on the metal plate 333 to prevent users from being scalded by direct accidental contact with the heating wire when reaching into the heating chamber 100. Furthermore, a thermal insulation net 122 may be added to the mounting frame 12. The metal plate 333 is located on a side of the thermal insulation net 122 facing away from the heating cavity 100, and the thermal insulation net 122 is arranged in a honeycomb structure.

In some embodiments, referring to FIG. 12, the second mounting sheet 331 includes a second heat conduction layer 3311 and a third heat conduction layer 3312. The second heating wire 332 is sandwiched between the second heat conduction layer 3311 and the third heat conduction layer 3312. The second heat conduction layer 3311 is fixed on the metal plate 333, such as by adhesive bonding. Each of the second heat conduction layer 3311 and the third heat conduction layer 3312 is an aluminum foil. The second heat conduction layer 3311 and the third heat conduction layer 3312 cooperatively wrap the second heating wire 332 by the vacuum encapsulation. The heat generated by the second heating wire 332 is conducted to the second heat conduction layer 3311 and then to the metal plate 333. The metal plate 333 is a galvanized steel plate, which has high thermal conductivity and low cost.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A towel heating device, comprising:
   two body members, arranged opposite to each other and capable of moving close to or away from each other;
   a foldable member, connected to the two body members, wherein the foldable member and the two body members cooperatively define a heating cavity, and the foldable member folds as the two body members move close to each other and unfolds as the two body members move away from each other; and
   a heating assembly, distributed on the foldable member and at least one of the two body members and configured to heat the heating cavity;
   wherein the heating assembly comprises a flexible heating sheet and at least one heating plate; the flexible heating sheet is mounted on the foldable member, and each of the at least one heating plate is mounted on a respective one of the two body members;
   each of the at least one heating plate comprises a mounting sheet, a heating wire, and a metal plate, the metal plate is mounted on the respective one of the two body members, the mounting sheet is fixed on the metal plate, and the heating wire is distributed on the mounting sheet.

2. The towel heating device according to claim 1, wherein the heating assembly further comprises a control board, each of the flexible heating sheet and the at least one heating plate is electrically connected to the control board, the control board is mounted on the foldable member or either of the two body members.

3. The towel heating device according to claim 2, wherein the flexible heating sheet comprises another mounting sheet and another heating wire distributed on the another mounting sheet, and the another mounting sheet is mounted on the foldable member.

4. The towel heating device according to claim 3, wherein a distribution path of the another heating wire is arranged as a continuous curve.

5. The towel heating device according to claim 3, wherein the foldable member comprises at least three partitions sequentially connected to each other, and two adjacent partitions of the at least three partitions are capable of bending toward each other;
the another heating wire comprises at least three heating portions, and each of the at least three heating portions is distributed on a respective one of the at least three partitions.

6. The towel heating device according to claim 5, wherein one of the at least three partitions is configured as a bottom wall corresponding to the heating cavity, the other two of the at least three partitions face each other, and each of the other two of the at least three partitions is configured as a respective one of two side walls corresponding to the heating cavity;
at least one of the two body members defines a mounting cavity, the control board is mounted in the mounting cavity, the another heating wire is arranged with a connection end at the bottom wall, and the connection end extends into the mounting cavity and is electrically connected to the control board.

7. The towel heating device according to claim 6, wherein each of the two body members comprises a shell and a mounting frame mounted on the shell, the mounting cavity is defined in the shell, the mounting frame is configured to mount the at least one heating plate, a first wire hole is defined in a bottom portion of the shell or a bottom portion of the mounting frame, and the connection end passes through the first wire hole.

8. The towel heating device according to claim 3, wherein the another mounting sheet comprises a first heat conduction layer and a thermal insulation layer, the another heating wire is arranged between the thermal insulation layer and the first heat conduction layer, the first heat conduction layer faces the heating cavity, and the thermal insulation layer faces away from the heating cavity.

9. The towel heating device according to claim 8, wherein the first heat conduction layer is an aluminum foil.

10. The towel heating device according to claim 2, wherein the foldable member is sheet-shaped, and the flexible heating sheet is wrapped in the foldable member.

11. The towel heating device according to claim 2, further comprising a power cord, wherein each of the two body members comprises a shell and a mounting frame mounted on the shell, the shell defines an mounting cavity, the mounting frame is configured to mount the heating plate, the control board is mounted in the mounting cavity of one of the two body members, a power cord hole is defined in a bottom portion of the shell or a bottom portion of the mounting frame, and the power cord passes through the power cord hole and is electrically connected to the control board.

12. The towel heating device according to claim 11, wherein the control board is mounted on the one of the two body members, the other of the two body members is arranged with a wire winding structure having a rod, and the power cord is capable of winding around the rod when the power cord is not in use.

13. The towel heating device according to claim 11, wherein the shell is rigid.

14. The towel heating device according to claim 1, wherein a distribution path of the heating wire is arranged as a continuous curve.

15. The towel heating device according to claim 1, wherein the mounting sheet is arranged on a side of the metal plate facing away from the heating cavity.

16. The towel heating device according to claim 1, wherein the mounting sheet comprises a second heat conduction layer and a third heat conduction layer, the heating wire is arranged between the second heat conduction layer and the third heat conduction layer, and the second heat conduction layer is fixed on the metal plate.

17. The towel heating device according to claim 16, wherein the second heat conduction layer is adhesively fixed on the metal plate.

18. The towel heating device according to claim 16, wherein each of the second heat conduction layer and the third heat conduction layer is an aluminum foil.

19. The towel heating device according to claim 1, wherein the metal plate is a galvanized steel plate.

* * * * *